United States Patent

Barton et al.

[11] Patent Number: 5,861,896
[45] Date of Patent: Jan. 19, 1999

[54] CONTROLLING INK MIGRATION AND PHYSICAL COLOR GAMUT DISCONTINUITIES IN DIGITAL COLOR PRINTING

[75] Inventors: David C. Barton, Vancouver, Wash.; William J. Allen, Portland, Oreg.

[73] Assignee: Hewlett-Packard Company, Palo Alto, Calif.

[21] Appl. No.: 401,650

[22] Filed: Mar. 10, 1995

Related U.S. Application Data

[63] Continuation of Ser. No. 954,838, Sep. 30, 1992, abandoned.

[51] Int. Cl.[6] ............................. B41J 2/205; B41J 2/21; G03F 3/08; G05B 15/00
[52] U.S. Cl. ........................... 347/15; 347/43; 358/529; 395/109
[58] Field of Search .................................. 347/43, 15, 9; 358/521, 529, 518, 502; 395/109

[56] References Cited

U.S. PATENT DOCUMENTS

| | | | |
|---|---|---|---|
| 4,656,505 | 4/1987 | Yamada et al. | 358/521 |
| 4,908,712 | 3/1990 | Uchiyama et al. | 347/43 X |
| 4,953,015 | 8/1990 | Hayasaki et al. | 358/529 |
| 4,994,901 | 2/1991 | Parulski et al. | 358/530 |
| 5,038,208 | 8/1991 | Ichikawa et al. | 347/43 X |
| 5,057,852 | 10/1991 | Formica et al. | 347/43 |
| 5,168,552 | 12/1992 | Vaughn et al. | 395/109 |

*Primary Examiner*—David F. Yockey

[57] ABSTRACT

In color graphics printing, incompatible inks, such as true black and color inks, tend to bleed across color field boundaries. Moreover, in four-color systems, there is a discontinuity in the physical color gamut, as distinguished from the logical color gamut, associated with the redundant color. A method is disclosed for alleviating both problems by adjusting image data prior to dithering. The method slightly shifts the logical color indicated in the image data so as to avoid the discontinuity that arises with neutral colors. Preferably, in a four-color printing system, yellow is depleted in the image data, so that after dithering, more dots of blue ink are printed in a given area than would be printed otherwise. For each pixel, the amount of correction is inversely related to the color saturation. The presence of blue ink dots within the substantially black field reduces bleed along the field edges.

16 Claims, 4 Drawing Sheets
(1 of 4 Drawing(s) Filed in Color)

CONTROLLING INK MIGRATION AND PHYSICAL COLOR GAMUT DISCONTINUITIES IN DIGITAL COLOR PRINTING

CROSS REFERENCE TO RELATED APPLICATION

This is a continuation of application Ser. No. 07/954,838 filed on Sep. 30, 1992, now abandoned.

BACKGROUND OF THE INVENTION

This invention relates to the field of digital color printing and, more particularly, to improving print quality by controlling migration or "bleeding" between incompatible liquid printing solutions in a printed product. The invention also is directed to alleviating physical color gamut discontinuities in printing systems, e.g. CMYK systems, that have a redundant color of ink.

Ink jet print cartridges include a plurality of orifices or nozzles, often arranged in vertical columns, for ejecting drops of ink onto the paper. For color ink jet printing, the print cartridge typically includes nozzles for ejecting cyan, magenta and yellow colored inks, called the primary printing colors, or simply "primaries." Some systems additionally include nozzles for ejecting black ink.

Printing occurs as the print cartridge traverses across the width of the paper (a "pass"). As it does so, discrete drops of ink ejected from the nozzles strike the paper or other substrate and then dry to form dots that, when viewed together, create the permanently printed image. Desired image colors are created by combining drops of ink of the primary colors where necessary. The individual dots, typically located on 1/300 inch centers, are not readily discernable to the unaided human eye so that arrays of dots can be printed to form what appear to be solid fields of a desired color.

An important consideration in printing strategies in an ink jet printing system is the intended printing medium. For example, overhead transparencies (OHT) have less affinity for absorbing ink than does a typical paper. As a result, drops of ink deposited on an OHT tend to bead rather than diffuse, as compared to drops deposited on paper. Additionally, the drops of ink deposited on OHT take longer to dry.

U.S. Pat. No. 4,748,453 (Lin et al.) discloses a method of depositing spots of liquid ink upon selected pixel centers on overhead transparencies so as to prevent the flow of liquid ink from one spot to an overlapping adjacent spot. According to that method, a line of information is printed in at least two passes so as to deposit spots of liquid ink on selected pixel centers in a checkerboard pattern, wherein only diagonally adjacent pixel areas are deposited in the same pass. On the second pass, the complementary checkerboard pattern is deposited, thereby completing deposit of ink on all of the pixels in a desired area.

Printing on paper, however, presents a different problem. Paper has an affinity for the liquid ink so that substantial absorption and diffusion of each drop of ink generally occurs. On the one hand, diffusion from one drop of ink to a drop that occupies an adjacent pixel area is helpful in achieving color mixing and obtaining a solid appearance. Along a boundary between two adjacent fields of different colors, however, such diffusion results in color bleeding across the boundary, making the boundary appear fuzzy. This is an undesirable result.

U.S. Pat. No. 5,012,257 (Lowe, et al.) discloses a two-by-two pixel ("superpixel") printing strategy to reduce bleed across color boundaries while providing good color saturation. That solution, however, effectively reduces the printer resolution, as each pixel of data is printed as a corresponding two-by-two superpixel, thereby actually printing four pixel locations. Color saturation is discussed in J. Foley, et al., COMPUTER GRAPHICS PRINCIPLES AND PRACTICE (2d.ed. Addison-Wesley, 1990) at 592.

Ink absorption can be controlled to some extent by the ink chemistry. When printing black, for example text in a letter, limiting absorption is desirable in order to provide a solid black appearance, and sharp, well-defined edges of characters. For that reason, black ink is designed to be absorbed less readily than color inks. Unfortunately, this has the effect of exacerbating bleeding where black ink touches or comes very close to color inks. Black ink is therefore said to be incompatible with color inks. Other inks may be incompatible as well. FIG. 2 illustrates the bleeding problem between a black field and an adjacent yellow field.

The incompatibility problem does not appear where composite black is used instead of true black ink, as composite black is made up of color inks. It is preferable, however, to print with a true black ink wherever possible, rather than composite black, for the following reasons:

1. True black looks better than composite black. Because of practical limitations in ink chemistry, composite black often has a colored tint to it. It might appear, for example, as greenish-black, or bluish-black. Also, the print quality of composite black is more variable over paper type, temperature, humidity and other factors than true black ink.

2. In a typical computer system, print data is sent from the host computer to the printer to control the printing of each of the four colors, CMYK, where K represents black (to avoid confusion with the color blue). If an area on a page is printed with composite black, information must be sent to the printer for the CMY inks. If the same area is printed with a black pen (true black), only data for the K ink must be sent. So use of the black pen represents a potential three-to-one reduction in data transmission between the host and the printer.

3. When printing composite black, the color pen must make three passes over the same region, the first pass putting down cyan ink, the second magenta and lastly yellow. If the same region is printed with the black pen, the black pen needs to make only one pass over the region to put down black ink. This represents a significant improvement in printing speed.

What is needed, therefore, is a liquid ink printing system that allows mixing true black and color inks within a printed page and provides for high resolution printing while controlling ink migration or "bleeding". In general, ink migration (bleed) occurs due to differences in chemical and/or physical properties of inks that must touch (or come very close to) each other on a printed page. In some cases, a substantial difference in surface tension appears to be the culprit, but other factors may contribute.

One way to avoid ink migration is to maintain at least a specified minimum separation between incompatible inks, e.g. black and color inks, on a printed page so that the inks cannot interact with one another. Methods of color separation are described in commonly-owned patent application Ser. No. 07/784,498. According to the invention of that application, black data which would be printed too close to color is instead printed as composite black (i.e. using color inks). This approach is not ideal, however, for some applications because black data "propagates" over the page as composite black, forcing use of composite black even in some areas seemingly remote from color (non-black) data. A need remains, therefore, to allow liquid ink color printing, including use of true black ink and color inks, or other combinations of otherwise incompatible inks, without unsightly bleeding between the inks.

Another problem in the prior art of digital color printing is the discontinuities that typically appear in a printing device's physical (true) color gamut. These discontinuities appear in systems having at least one redundant color, i.e. systems that have more than one physical way to produce the same logical color. By "physical color" we mean the color actually produced on a printed page, as might be observed by counting drops of C, M and Y inks. This is distinguished from a "logical color" which is image data, for example CMY data, comprising 8-bit digital values for each primary color for each pixel.

SUMMARY OF THE INVENTION

One aspect of the present invention is a method of reducing or eliminating a discontinuity in the physical color gamut of printing systems that have a redundant color ink, such as a CMYK system, in which black is redundant. A discontinuity occurs when dithering produces a pure area of the redundant ink. According to the invention, the logical color of each pixel of image data is slightly adjusted before dithering, by adding a carefully selected quantity of a selected adjustment color.

The adjustment color preferably comprises at least two primary colors, preferably cyan and magenta (blue). Adding blue to the image data results in replacing some of the black dots with blue dots in the printer data. Adding blue is conveniently effected in a CMY system by reducing the yellow value. Shades of gray exhibit discontinuities in the physical color gamut as distinguished from the logical color gamut (specified by the digital image data) for reasons explained below. Such discontinuities are avoided by adjusting the image data slightly so as to avoid neutral gray. The result is to provide a substantially continuous spectrum of physical colors in a printed product, with improved saturation.

An appropriate amount of adjustment is greater for pixels having substantial black content, as the redundant (black) ink appears more frequently in the printed image. Conversely, for pixels with high color saturation, i.e. low black content, less adjustment is needed as dots of the redundant color will appear relatively infrequently. The amount of adjustment depends upon each pixel's color saturation value.

Specifically, the selected amounts of adjustment for each pixel of image data increase as the corresponding color saturation values decrease, so that a predetermined maximum adjustment is made to neutral pixels, i.e. shades of gray, while substantially no adjustment is made to pixels having 100% color saturation. The maximum adjustment amount generally will be within a range of less than approximately 25 percent. This has been found adequate to achieve the desired results, without noticeably shifting color hues in the printed product.

Another aspect of the invention includes a method of controlling bleeding between incompatible inks in a liquid ink printing system such as an ink jet printer. According to the invention, digital color image data ("logical data") is modified, prior to dithering, so as to add a small amount of a selected primary color to the data. Preferably, in a four-color (CMYK) printing system, this adjustment comprises reducing the yellow value in each pixel of the image data so that after dithering, proportionately fewer dots of yellow ink are printed in a given area than would be printed otherwise. Where the logical data specifies pure black, the method has the effect of replacing some black dots with blue dots on the printed page. The presence of occasional blue dots within an otherwise black field is hardly noticeable, yet reduces bleed along the field edges.

An appropriate amount of adjustment is greater for pixels having substantial black content. Conversely, for pixels with high color saturation, i.e. low black content, less adjustment is needed. Indeed, corrupting a pixel substantially saturated with a first color by increasing the amount of a second primary color could adversely impact the appearance of the printed product. The amount of adjustment for controlling bleed thus also varies with each pixel's color saturation value.

Specifically, a predetermined maximum amount of adjustment is made to neutral pixels, i.e. shades of gray, while substantially no adjustment is made to pixels having 100% color saturation. The maximum adjustment necessary to control bleed without noticeably impacting color hue must be optimized for the specific dithering algorithm, target printer, ink chemistry, intended paper (or other printing media), etc. Preferably the maximum adjustment is within a range of less than approximately 25 percent. In one example of a commercial embodiment of the invention, we have selected a maximum adjustment of 7.5%. This value was found adequate to achieve the desired results, without noticeably shifting color hues in the printed product.

Thus it may be appreciated that the methods disclosed herein may be used to both control bleed and alleviate the physical color gamut discontinuity problem. Both problems are addressed by a single adjustment to the image data as disclosed.

The foregoing and other objects, features and advantages of the invention will become more readily apparent from the following detailed description of a preferred embodiment which proceeds with reference to the drawings.

BRIEF DESCRIPTION OF THE DRAWINGS

The file of this patent contains one drawing sheet executed in color. Copies of this patent with color drawings will be provided by the Patent and Trademark Office upon request and payment of the necessary fee.

DETAILED DESCRIPTION OF THE PREFERRED EMBODIMENT

Nomenclature

Figure 1:
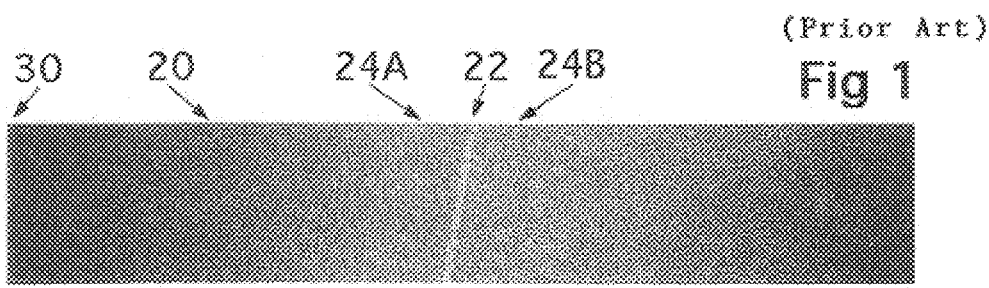
FIG. 1 is a prior art color print sample illustrating a discontinuity in the physical color gamut where the logical data passes through a neutral gray color.

Color image data comprises a value for each primary color for each pixel of an image. An eight-bit value, for example, provides a range of 0 to 255 "counts" or digital units for each primary. Each pixel of image data thus includes a total of 24 bits in a three-color system. Gray is indicated by equal values for all three primaries. In monochrome systems, eight bits provides a 0–255 count gray scale. Certainly other resolutions, both higher and lower, are used. In any event, we refer to this type of full-resolution data as "image data".

A "logical color" is a color specified by a pixel of image data. In a theoretical perfect printing system, the color of a physical pixel on the printed page exactly matches the logical color of the corresponding pixel of image data.

Digital halftoning is used to effect the perception of millions of colors, even though the print cartridge actually provides only three colors of ink: cyan, magenta and yellow. Put another way, digital halftoning, also referred to as spacial dithering, is the method of rending the illusion of continuous-tone pictures on displays that are capable of producing only binary picture elements (pixels). There are various digital halftoning techniques. The halftoning algorithm must be selected and adapted so as to match the specific parameters of any target display device, such as a printer, taking into account its resolution, aspect ratio, etc.

The present invention preferably is implemented in software, e.g. in a printer driver, and operates by adjusting color image data. Thereafter, the adjusted data undergoes a digital halftoning ("dithering") process to reduce it to the resolution of the target device, here an ink jet printer. Many ink jet printers have three color inks available: cyan, magenta and yellow. Hence, the printer can resolve only 3 bits per pixel of printer data, one bit for each primary color. A selected dithering process provides the appropriate printer data as its output. We will use the terms "3-bit data" or "printer data" herein to mean resulting data after dithering. Printer data generally is transmitted to the ink jet printer, where it may undergo additional processing before actual printing.

Some liquid ink printing systems also provide a separate ink for printing a particular logical color, while the same logical color may also be produced with a composite of some or all of the other inks available in the system. For example, in a four-color system having cyan, magenta, yellow and true black (CMYK) inks, there are two ways to produce the logical color black. Logical black may be produced by using the true black ink alone, or by a combination of cyan, magenta and yellow. We therefore call true black a "redundant color".

The "physical color gamut" of a printing system is the corresponding set of physical colors actually produced on a printed product in response to the full gamut of logical colors, i.e. all possible image data values.

Printing Neutral Colors

Black, white and shades of gray are neutral. "Neutral" means the image data values for each primary color are equal. If all three primary values are zero, no ink is printed; the pixel is white. If all three primaries are at maximum value (e.g. 255 units in a 24-bit system), black is specified, and all three primaries are ON in the corresponding printer (3-bit) data. In a three-color system (e.g CMY), all three primaries are printed for the pixel to create composite black. In a four-color system, e.g. CMYK, true black is substituted for the black pixel and the other three primaries turned off.

"Grayness" is an indicator of how close the primary values are to each other, in other words an indication of the range or spread of the primary values. Where the primary values are exactly equal, the color is pure gray or 100% gray. A pure primary color is 0% gray. All colors other than pure primaries (or a composite of two pure primaries) thus have some gray content. Color saturation, for present purposes, is considered the complement of grayness. Thus, color saturation equals one minus grayness, as further explained below and illustrated in the tables.

Figure 6A:
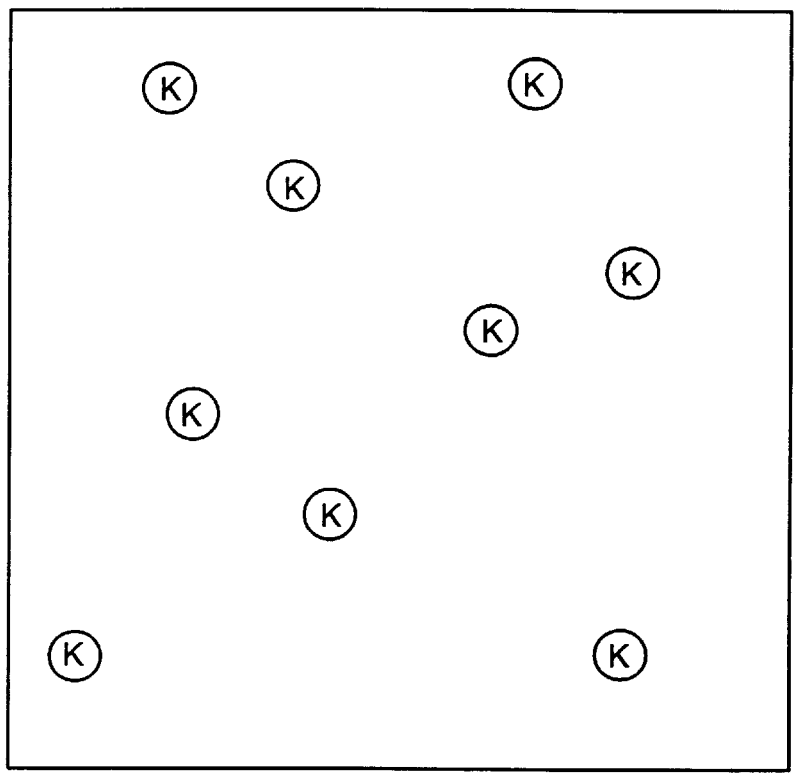
FIG. 6A illustrates dots produced by a known four-color ink jet printing system using true black ink in lieu of composite black to form a neutral gray area.

"Darkness" (or blackness) of a pixel is an indication of how close the pixel color is to black. The closer to black, the darker the color. If the color is neutral (100% gray), the common value of the primaries determines the darkness of the pixel. The lower the value, the lighter the appearance of a corresponding area of a printed image. Darkness is commonly expressed as a percentage of the maximum value, in other words as a percentage of black. For example, where 255 is the maximum value, C=Y=M=9 yields 9/255 or approximately 3.5% black. A neutral, 3.5% black area is illustrated in FIG. 6A.

Since all three primary values are the same for gray, and each color plane is dithered separately, the resulting printer data will be the same for each color plane on a dot-for-dot basis. In other words, for the dot locations to be printed, all of them will have C,M and Y on. The percentage of the dot locations printed is the same as the percentage darkness. So continuing the 3.5% black example, nine out of 256 dot locations will be printed with CMY in a three-color system, the remaining locations being left white. However, since true black is preferred over composite black, true black ink will be used to print those same dot locations in a four-color system. No drops of CMY therefore appear in the gray region. The resulting dot pattern is illustrated in FIG. 6A. Note that one drop of ink is printed per pixel for true black, rather than two or three drops per pixel for composite black, so the gray region appears lighter in a printed product than if the same data were printed with composite black. This difference in dot density leads to a discontinuity in the physical color gamut where the logical data passes through neutral values.

Figure 6B:
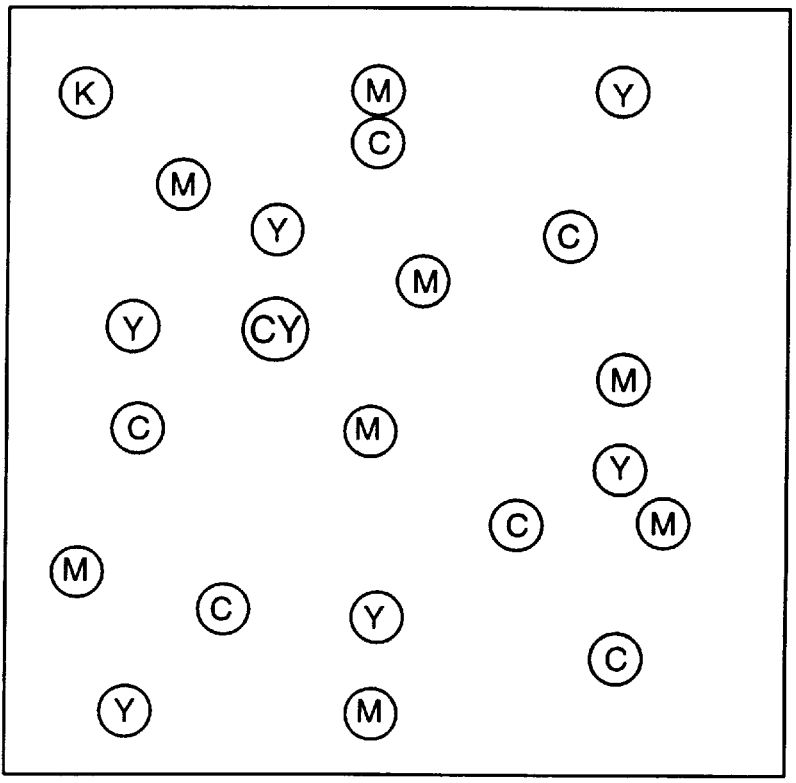
FIG. 6B illustrates the neutral gray area of FIG. 6A rendered after adjustment according to the invention.

FIG. 6B illustrates a gray area printed in response to image data that had been adjusted prior to dithering according to the invention. (The figure also reflects the effects of an error diffusion dithering algorithm.) Compare to FIG. 6A, which is based on the very same 3.5% darkness image data, printed without the adjusting the image data.

Physical Color Gamut Discontinuity

Referring now to FIG. 1, a prior art color print sample 20 is shown to illustrate a discontinuity in the physical color gamut where the logical data passes through a neutral gray color. The image data used to generate the print sample 20 has continuously varying color content (within the limits of resolution of the data), from pure red (both magenta and yellow at maximum values, and cyan off), in corner 30, to pure cyan (both magenta and yellow off), in corner 40. A discontinuity in the physical color gamut appears as the printer data passes through neutral (i.e. where magenta, yellow and cyan values are equal).

The discontinuity appears as a lightened gray band 22, approximately vertical, and about one-eighth inch wide in the drawing. On the other hand, where the primary values are not quite equal, in other words, where even a little color is indicated in the logical data, since each plane is dithered separately, the resulting printer data will direct dot placement that varies in a more or less random fashion. Note the regions 24A, 24B near the neutral region. In these areas, only a very few dots will happen to have all three CMY colors on, and only those few dots therefore, will be printed with true black ink. Most of the gray content will be formed by randomly located dots of the various primary colors, some of those dot locations having two primary colors. The result is, for even a little color, i.e. for a logical color that is nearly but not exactly neutral (gray), significantly more ink is applied to the paper than if the logical color happened to be exactly neutral. So a small change in the logical data that crosses the "neutral line" (in a conceptual three-color space) causes a significant change or discontinuity in the physical color and its appearance on the printed product. The discontinuity could be avoided by always using composite black. This is undesirable, however, since composite black is inferior to true black, as discussed above. What is needed is to produce a continuous physical color gamut over the entire range of logical colors.

Figure 7:
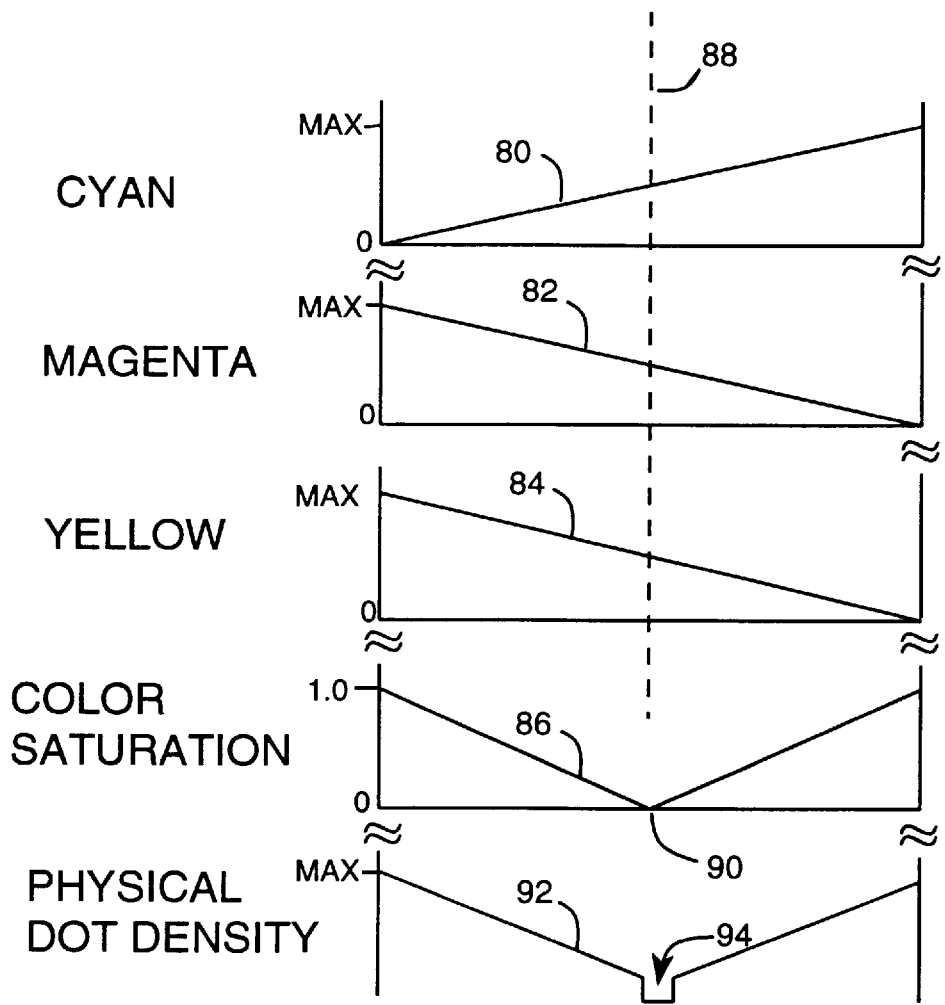
FIG. 7 is a conceptual illustration of a discontinuity in the physical color gamut where logical image data passes through a neutral gray color.

FIG. 7 further illustrates the discontinuity problem. It shows a logical color gamut formed by continuously varying values of cyan 80, magenta 82 and yellow 84. Logical color saturation varies as shown in curve 86, having a minimum 90 (zero saturation) where the CMY data is neutral, as indicated by dashed line 88. The physical color gamut exhibits an apparent color saturation as illustrated by curve 92, having a discontinuity 94 about the neutral line.

Adjusting Image Data

According to the present invention, the image data is modified to avoid the discontinuity by adjusting each pixel so as to avoid neutral data. This may be done by logically adding a carefully selected amount of a predetermined color, called the "adjustment color," to each pixel of image data. This is done in the preferred CMYK system by reducing the complementary color. If we consider each pixel of image data as a point in three-color space, this adjustment may be described as adding an adjustment vector to the image data point, thereby forming a new, adjusted data point. The direction of the adjustment vector is a color, i.e. the adjustment color. The magnitude of the adjustment vector, i.e the amount of adjustment, depends upon the color saturation of the pixel of interest, as described below.

The exact "adjustment color" must be selected for optimum performance in a target system. It depends upon various factors including the inks, dithering algorithm, paper selection, and subjective judgment about the resulting printed product. The adjustment color may be selectable among multiple colors, as well, under user-input or program control for various applications. For example, different adjustment colors may improve results for different papers.

In general, the adjustment color should be close to the redundant color. For example, in a CMYK system, the adjustment color should be dark so that it is less noticeable when substituted for the redundant color, true black. The adjustment color may be any logical color. The color adjustment has the effect of reducing the frequency of redundant color dots, and hence improves ink coverage in the printed image. This benefit may be maximized in some systems by adding an adjustment color that consists of two or even three primaries (composite black in a CMYK system).

We have found that depleting one primary color (yellow), in other words selecting a secondary color as the adjustment color (blue), provides a good, practical tradeoff for a CMYK system. In appropriate amounts, this depletion avoids the discontinuity around neutral colors and controls bleed, while maintaining high quality black printing. Selecting a secondary color as the adjustment color had the advantage of simplicity in implementation. Blue is the adjustment color of choice, as it is a dark primary color. In a CMY system, as noted, blue is added to an image data pixel by reducing the yellow value.

The appropriate amount of correction depends upon the color saturation of the pixel. If the pixel has substantial color saturation, little or no correction is necessary, as the discontinuity effect will not occur, or will not be apparent in the printed product to the unaided eye. Conversely, where there is little or no color saturation, i.e. the pixel is gray or nearly gray, more correction is necessary to avoid the discontinuity effect.

Measuring Color Saturation

Color saturation of a pixel of image data may be determined as a ratio of the "range" of the pixel to the highest color value indicated (among the three primaries). The range is defined as the difference between the highest value and the lowest value indicated among the three primaries. Several examples to illustrate the concept are shown in the following table:

TABLE I

Color Saturation Examples

| C | M | Y | MAX | MIN | RANGE | |
|---|---|---|-----|-----|-------|---|
|   |   | (RANGE/MAX) |   |   |   | COLOR SAT. |
| 0 | 0 | 240 | 240 | 0 | 240 | 1.00 (yellow) |
| 128 | 128 | 128 | 128 | 128 | 0 | 0.00 (med. gray) |
| 20 | 10 | 10 | 20 | 10 | 10 | 0.50 |
| 20 | 10 | 5 | 20 | 5 | 15 | 0.75 |
| 5 | 5 | 4 | 5 | 4 | 1 | 0.20 |
| 9 | 9 | 9 | 9 | 9 | 0 | 0.00 (light gray) |
| 220 | 230 | 250 | 250 | 220 | 30 | 0.12 |
| 10 | 20 | 250 | 250 | 10 | 240 | 0.96 |
| 0 | 128 | 100 | 128 | 0 | 128 | 1.00 (red) |

According to the invention, the yellow value is reduced to increase the blue content (i.e. cyan plus magenta) of the pixel. The correction must be subtle, so that colors are not unduly distorted. The correction generally should not exceed 25 percent. For most systems, five to ten percent works well. The actual value must be optimized for the target application, inks, paper, etc. The maximum correction is used when the color is neutral, i.e. color saturation is zero.

As color saturation increases, less correction is needed. Assume for illustration purposes that the maximum correction is selected to be 7.5 percent. This is the value we have selected for commercial use. So a corrected yellow value equals the original yellow value times a correction factor between 92.5% (maximum depletion) and 100% (no depletion). The actual correction factor applicable to a specific pixel depends upon the color saturation value. Thus, in algebraic terms, new yellow=old yellow×correction factor [92.5% to 100%]:

$$\text{correction factor} = MCF + [\text{color saturation} \times (1-MCF)],$$

where MCF is the maximum correction factor, i.e. 92.5% in the example. This formula, applied to the sample data shown in Table 1 above, yields the corrections shown in Table 2, below. (Figures are approximate)

TABLE 2

Color Adjustment Examples

| C | M | Y | COLOR SAT | Correction Factor | New Y (rounded) |
|---|---|---|-----------|-------------------|-----------------|
| 0 | 0 | 240 | 1.00 | 1.00 | 240 |
| 128 | 128 | 128 | 0. | 0.925 | 118 |
| 20 | 10 | 10 | 0.50 | 0.96 | 10 |

TABLE 2-continued

Color Adjustment Examples

| C | M | Y | COLOR SAT | Correction Factor | New Y (rounded) |
|---|---|---|---|---|---|
| 20 | 10 | 5 | | 0.75 | 0.98 | 5 |
| 5 | 5 | 4 | | 0.20 | 0.94 | 4 |
| 9 | 9 | 9 | (gray) | 0.00 | 0.925 | 8 |
| 220 | 230 | 250 | | 0.12 | 0.934 | 234 |
| 10 | 20 | 250 | | 0.96 | 0.997 | 249 |
| 0 | 128 | 100 | | 1.00 | 1.00 | 100 |

It may be observed from the examples that the maximum correction factor, 92.5%, is applied where the color saturation is zero. The resulting reduction in yellow value forces some cyan and magenta dots to be printed even where the original image data indicated black. This reduces use of true black in the printer data, as described above, especially near neutral colors, and thus alleviates the physical color gamut discontinuity.

Figure 5:
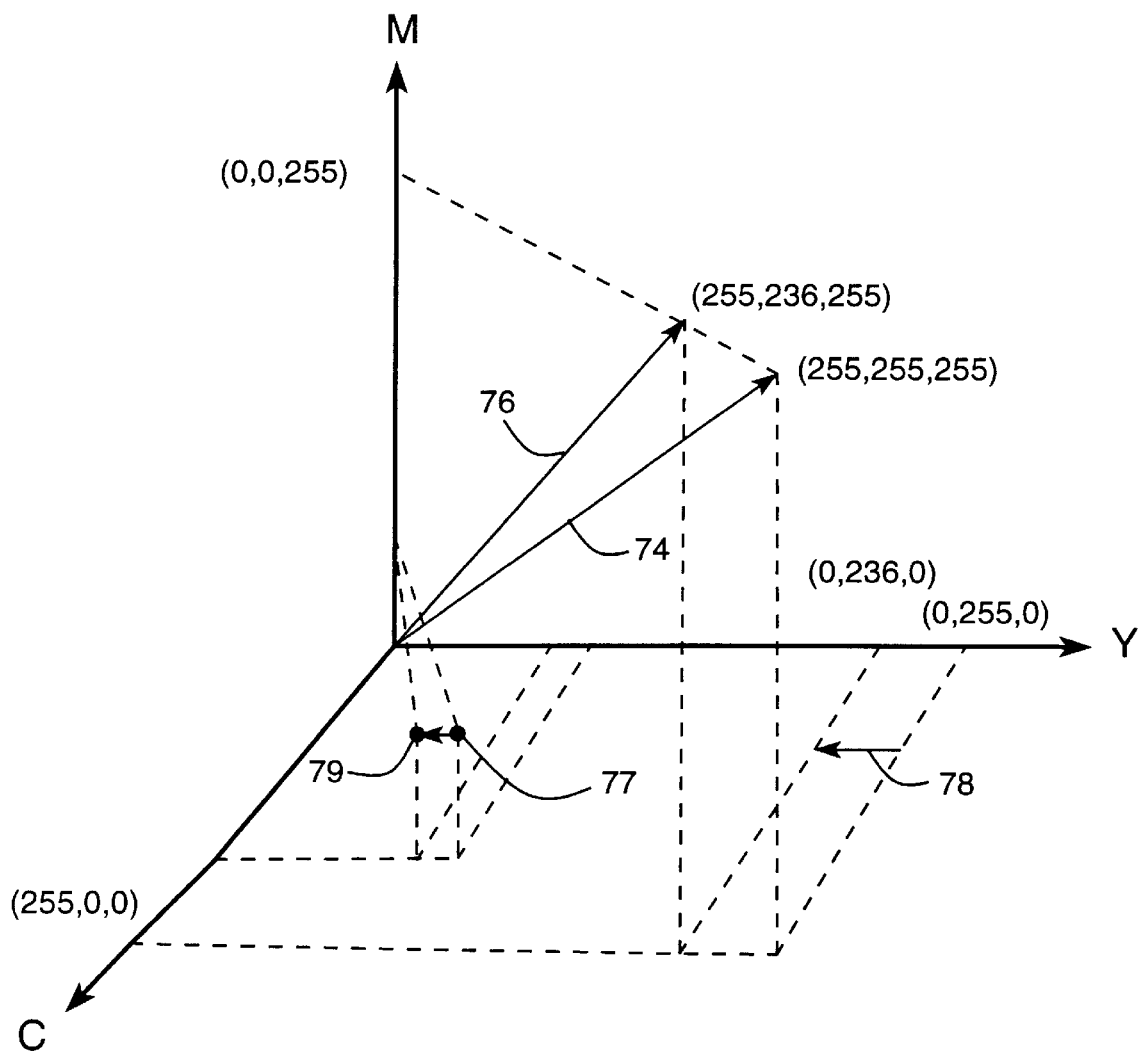
FIG. 5 is a three-color space conceptual illustration of color image data adjustment according to the present invention.

The image data adjustment concept is illustrated in the diagram of FIG. 5. Referring now to FIG. 5, orthogonal C, M and Y axes (cyan, magenta and yellow) are shown for representing color image data points. Vector 74 defines a black or gray line. All points along this line are neutral colors, as all three primary values are equal. At the tip of vector 74 is a first pixel, at location CMY=(255, 255, 255) (black). According to the invention, the black pixel is adjusted by reducing the yellow value, as indicated by vector 78 in the CY plane in the figure. Vector 76 points to the resulting adjusted pixel at location CMY=(255, 255, 236). This is the special case (black) in which the maximum correction is made.

Another example is shown by image data pixel 77 in FIG. 5. The image data pixel lies at CMY=(200, 50, 70). Correction is determined as follows. Saturation=150/200=0.75. New yellow value=old yellow×[92.5%+(0.75×7.5%)]. The resulting new yellow value is 69, a slight correction. In practice, integer arithmetic is preferred for speed, and rounding is applied.

Figure 3:
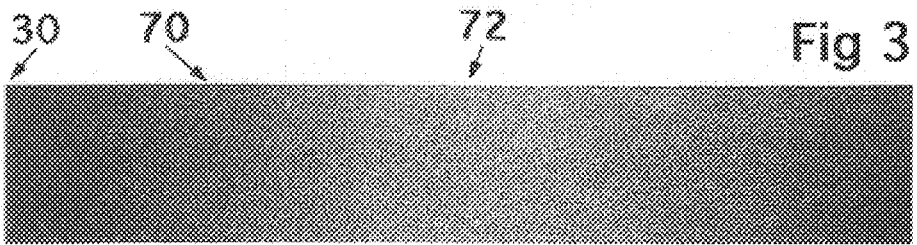
FIG. 3 is a color print sample prepared using an embodiment of the invention to illustrate the substantially continuous physical color gamut.

An example of the effect of the described adjustments is shown in FIG. 3. Referring now to FIG. 3, a print sample 70 was generated with continuously varying image data, as described with respect to FIG. 1. Here, prior to dithering, the image data was adjusted as described above, by depleting the yellow value, by a maximum of 7.5% at the neutral point 72. The magnitude of the correction was linearly reduced as the image data color saturation increased, to zero correction at the 100% color saturation endpoints 30,40. It may be observed that no discontinuity in the physical color gamut is visible.

Controlling Bleed

The foregoing adjustments to the image data also have the advantage of reducing bleed between incompatible inks. In the preferred embodiment, since a little blue is added to the image data, logical black image data pixels are shifted slightly toward blue. In our improved CMYK system, as noted, the yellow value is reduced for this purpose. The effect on the printed page is to introduce a relatively small number of blue dots within an otherwise black area. Since the correction is small, true black ink drops still predominate to provide a solid black appearance.

Figure 2:
FIG. 2 is a prior art color print sample illustrating bleeding between black and yellow color areas.
Figure 4:
FIG. 4 is a color print sample prepared using an embodiment of the invention to illustrate the effect of the invention in controlling bleed across a color field boundary.

The blue content, however (appearing as occasional cyan and/or magenta drops) helps to reduce bleed along the area boundary where the black field touches or comes close to a color field. It seems that the superior absorption of the color ink helps to retain the black dye within the black area, in other words reducing migration of the black dye toward the color field boundary. FIG. 4 is a color print sample comprising a yellow field 50 surrounding and touching a black field 64. Bleeding along the boundary 64 is reduced, as compared to the prior art print sample of FIG. 2.

Since essentially the same adjustment is made to address the color gamut discontinuity, a single adjustment to the image data may suffice to achieve these dual advantages. Where improved ink chemistry controls the bleed problem, a different correction color may be selected for addressing the discontinuity problem, as noted above.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for minimizing the physical color gamut discontinuity of an ink jet printer output formed by the application on a print media of a different density of redundant color ink dots at a preselected pixel location in place of primary color ink dots having equal data values, the method comprising:

(a) providing a print media on which a color image is to be printed;

(b) receiving color image data comprising a plurality of image data pixels, each of the plurality of image data pixels having a data value for each one of the primary colors;

(c) determining color saturation for each of the image data pixels from the color image data;

(d) adding adjustment color data to the color image data responsive to the determined saturation so that, for any given one of said image data pixels, less than all of the primary color data values are changed, to minimize the number of pixels having equal data values for each primary color so as to form adjusted image data representing an adjusted image, the adjusted image having minimized physical color gamut discontinuity; and (e) printing the adjusted image on the print media by applying primary color ink dots to the print media for each image data pixel having a density in accordance with the adjusted image data.

2. A method according to claim 1 wherein step (d) comprises:

selecting an adjustment color; and for each of the image data pixels of the image data, adding predetermined adjustment color value to the data values, thereby shifting the color image data along a physical color gamut of the print media in a direction of the adjustment color.

3. A method according to claim 2 wherein the adjustment color is selected from the group consisting of cyan, magenta, and yellow.

4. A method according to claim 1 wherein:

step (e) comprises liquid ink printing;

the primary colors are cyan, magenta and yellow;

the redundant color is true black; and step (d) comprises adding blue data value to the image data.

5. A method according to claim 4 wherein:

step (d) includes reducing a yellow data value for each of the image data pixels of the color image data; and further comprising determining a respective color saturation value for each of the image data pixels and selecting an amount of yellow color data value to be reduced for each of the image data pixels responsive to the color saturation value.

6. A method according to claim 5 wherein selecting the yellow color data value to be reduced includes:

selecting a maximum correction factor;

for a neutral pixel of the image data, reducing the yellow color data value by the maximum correction factor; and for each of the image data pixels that is not neutral, reducing the yellow color data value by a correction factor less than the maximum correction factor.

7. A method according to claim 6 wherein the correction factor is determined by:

$$CF=MCF+[CS\times(1-MCF)],$$

where $CF$=correction factor, $MCF$=maximum correction factor, and CS=color saturation.

8. A method according to claim 7 wherein the maximum correction factor (MCF) is approximately equal to 0.075.

9. A method according to claim 4 wherein the adding blue to the image data includes:

for each of the image data pixels of color image data, determining a corresponding color saturation value;

selecting a maximum correction factor;

selecting a second correction factor for each of the image data pixels, each second correction factor being related to the corresponding pixel color saturation value, such that the corresponding second correction factor equals the maximum correction factor for pixels having zero color saturation value, and the corresponding second correction factor for each of the image data pixels is less than the maximum correction factor for pixels having color saturation values greater than zero; and for each of the image data pixels, reducing the yellow value by multiplying the yellow color data value by the correction factor.

10. A method according to claim 9 wherein the selected second correction factors range from about the maximum correction factor value to about 100% of the amount of color image data prior to adding adjustment color data, the second correction factors being directly proportional to the color saturation values of the respective pixels, so that the maximum correction factor is selected for pixels having approximately zero color saturation value, and the second correction factor is selected to be approximately 100% of the color image data value prior to adding adjustment color data for pixels having color saturation values approximately equal to one.

11. A method according to claim 9 wherein the maximum correction factor equals approximately 92.5% of the color image data value prior to adding adjustment color data.

12. A method for minimizing color gamut discontinuity in an ink jet printer output, the method comprising:

providing a print medium on which to apply an image, said image formed of a plurality of pixel elements;

receiving first C, M and Y color image values for each of said pixel elements wherein at least one of said pixels has a grey component identified therewith formed by equal first C, M and Y values;

comparing said first C, M and Y color image values for each of said pixel elements to identify said at least one of said pixels having a grey component identified therewith formed by equal first C, M and Y values;

for each of said pixel elements having equal first C, M and Y values, adjusting a selected one but less than all of the first C, M and Y values to yield an adjusted value so that said adjusted value is different from said selected one of the first C, M and Y values; and applying a density of C, M and Y ink dots on said print medium for each of said pixel elements in response to said color image values and said adjusted value associated with each of said pixel elements.

13. The method according to claim 12 wherein the step of adjusting a selected on of the first C, M and Y values includes adding a selected amount to said first C value.

14. The method according to claim 12 wherein the step of adjusting a selected one of the first C, M and Y values includes:

determining a respective color saturation value for each of the pixel elements; and substracting a selected amount from said first Y value responsive to said color saturation value.

15. The method according to claim 14, wherein the step of subtracting a selected amount from said first Y value includes:

selecting a maximum correction factor; and reducing the first Y value by the maximum correction factor, the method further including the step of reducing the first Y value for pixels having first C, M and Y values which are not equal by a correction factor less that the maximum correction factor.

16. The method according to claim 15, wherein the correction factor is determined by:

$$CF=MCF+[CS\times(1-MCF)]$$

where,

CF=correction factor;

MCF=maximum correction factor; and

CS=color saturation.

* * * * *

UNITED STATES PATENT AND TRADEMARK OFFICE
CERTIFICATE OF CORRECTION

PATENT NO : 5,861,896
DATED : January 19, 1999
INVENTOR(S) : Barton et al.

It is certified that error appears in the above-identified patent and that said Letters Patent are hereby corrected as shown below:

Column 12, (line 24), delete "on" and insert therefor --one--.

Column 12, (line 42), delete "that" and insert therefor --than--.

Signed and Sealed this

Twenty-first Day of September, 1999

Attest:

Q. TODD DICKINSON

*Attesting Officer*     *Acting Commissioner of Patents and Trademarks*